US008090770B2

United States Patent
Fusz

(10) Patent No.: US 8,090,770 B2
(45) Date of Patent: Jan. 3, 2012

(54) SYSTEMS AND METHODS FOR IDENTIFYING NON-TERRORISTS USING SOCIAL NETWORKING

(75) Inventor: Eugene A. Fusz, Palm Beach, FL (US)

(73) Assignee: Fusz Digital Ltd., Palm Beach, FL (US)

( * ) Notice: Subject to any disclaimer, the term of this patent is extended or adjusted under 35 U.S.C. 154(b) by 283 days.

(21) Appl. No.: 12/423,529

(22) Filed: Apr. 14, 2009

(65) Prior Publication Data

US 2010/0262649 A1 Oct. 14, 2010

(51) Int. Cl.
G06F 15/16 (2006.01)

(52) U.S. Cl. .......... 709/203; 709/204; 709/224

(58) Field of Classification Search .......... 709/217–219, 709/224, 203–207
See application file for complete search history.

(56) References Cited

U.S. PATENT DOCUMENTS

| | | | |
|---|---|---|---|
| 5,991,429 A | 11/1999 | Caffin et al. | |
| 6,631,346 B1 | 10/2003 | Karaorman et al. | |
| 7,136,513 B2 | 11/2006 | Waehner et al. | |
| 7,277,891 B2 | 10/2007 | Howard et al. | |
| 7,299,405 B1 | 11/2007 | Lee et al. | |
| 7,779,032 B1 * | 8/2010 | Garfinkel | 707/776 |
| 7,856,411 B2 * | 12/2010 | Darr | 706/45 |
| 2002/0129022 A1 | 9/2002 | Majewski et al. | |
| 2003/0051054 A1 | 3/2003 | Redlich et al. | |
| 2004/0078190 A1 | 4/2004 | Fass et al. | |
| 2005/0097051 A1 * | 5/2005 | Madill et al. | 705/50 |
| 2005/0154580 A1 | 7/2005 | Horowitz et al. | |
| 2005/0216555 A1 * | 9/2005 | English et al. | 709/204 |
| 2005/0243736 A1 * | 11/2005 | Faloutsos et al. | 370/254 |
| 2006/0085370 A1 | 4/2006 | Groat et al. | |
| 2006/0101120 A1 | 5/2006 | Helsper et al. | |
| 2006/0114325 A1 | 6/2006 | von Hausen | |
| 2006/0173701 A1 | 8/2006 | Gurvey | |
| 2006/0184483 A1 | 8/2006 | Clark et al. | |
| 2007/0122003 A1 | 5/2007 | Dobkin et al. | |
| 2007/0198450 A1 | 8/2007 | Khalsa | |
| 2007/0244981 A1 | 10/2007 | Malden et al. | |
| 2008/0091817 A1 | 4/2008 | Mardirossian | |
| 2010/0121707 A1 * | 5/2010 | Goeldi | 705/14.49 |
| 2010/0121849 A1 * | 5/2010 | Goeldi | 707/736 |

* cited by examiner

*Primary Examiner* — Faruk Hamza
(74) *Attorney, Agent, or Firm* — Armstrong Teasdale LLP

(57) ABSTRACT

A method for identifying non-terrorists among a plurality of participants and/or potential participants using a communication system includes electronically communicating a verification request from a first participant to a second participant, wherein the second participant is a member of a personal network of the first participant, and electronically communicating a verification request from the second participant to a third participant, wherein the third participant is a member of a personal network of the second participant. The method also includes receiving replies to the verification requests sent by the first and second participants, and determining a likelihood that the first participant is a non-terrorist threat based on the replies received from the second and third participants.

24 Claims, 7 Drawing Sheets

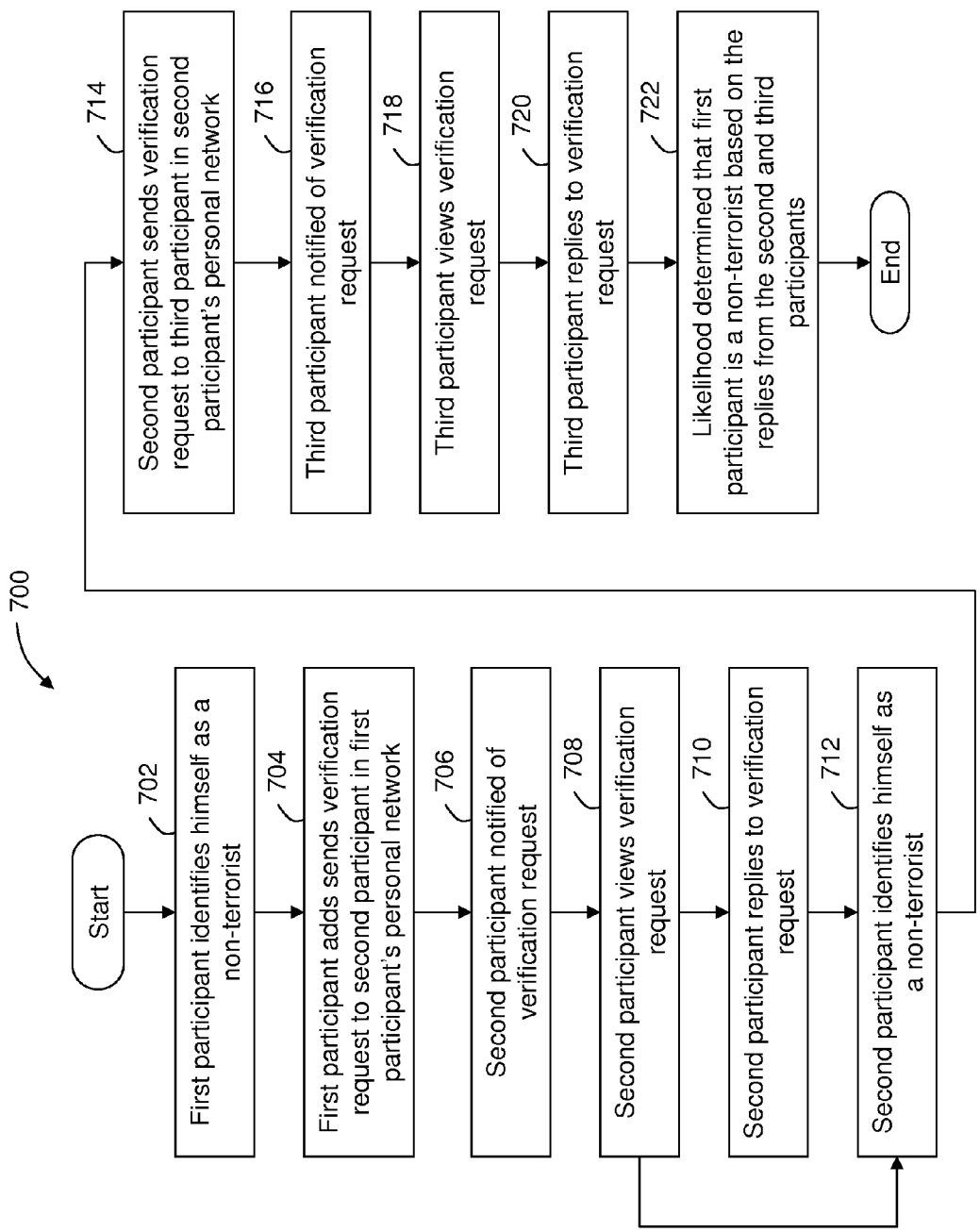

SYSTEMS AND METHODS FOR IDENTIFYING NON-TERRORISTS USING SOCIAL NETWORKING

BACKGROUND OF THE INVENTION

The embodiments described herein relate generally to communication systems and, more particularly, to social network communication systems that facilitate identifying non-terrorists within a group of system participants and non-participants.

The Sep. 11, 2001 terrorist attacks on the United States have focused attention on the need to harness technologies for use in homeland security and counter-terrorism purposes. Accordingly, many new systems have been proposed. Some of these systems involve surveillance, information gathering, and/or monitoring health data. Such systems are provided by both private entities and by the government. However, many members of the public continue to have a desire to assist in counter-terrorism measures in ways that do not involve developing new products or undergoing intrusive searches and/or background checks. Although, the public has a desire for safety, many members of the public do not wish to exchange safety for a lack of privacy.

At least some known systems attempt to identify individuals using features such as facial recognition, fingerprint analysis, and/or other biometric information. For example, at least some known systems an image of a person's face is enrolled in a computer system. At certain times, such as at an airport check-in terminal, stored images are compared to an image obtained using a live camera. Individuals, such as known or suspected terrorists or criminals, are identified by matching the live camera image to the stored images, thereby enabling authorities to detain such individuals prior to boarding a means of transportation. However, such systems do not attempt to identify individuals as non-terrorists at an earlier point using social networking, in order to narrow a search for potential terrorists at a later time.

Moreover, at least some known systems provide terrorism intelligence indications and warnings based on a number of forecasting questions and priorities. More specifically, at least some known systems describe systematic data processing methods for known intelligence data in order to facilitate better and faster analysis of constantly-growing amounts of data. However, such systems rely on analyzing known data rather than identifying terrorists among a large group of system participants. Furthermore, at least some known systems attempt to identify terrorists and locate known terrorists using a dormant software-based worm that monitors incoming connections to a communications server. The worm is transmitted by the server over the connection, and broadcasts identification and/or location information to one or more receiving nodes. However, such systems effectively monitor people without permission and possibly without cause, thereby risking privacy violations.

Accordingly, it is desirable to provide a method for identifying non-terrorists among a plurality of voluntary participants or non-participants using a communication system that is governed by a non-governmental board of governors from consumer advocate organizations and privacy organizations. Moreover, it is desirable to provide this communication system such that privacy of each participant is ensured as much as possible.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for identifying non-terrorists among a plurality of participants and non-participants using a communication system governed by a non-governmental board of governors from consumer advocate organizations and privacy organizations. The communication system includes a plurality of client systems and a server system connected to the plurality of client systems through a network. The method includes electronically communicating, via the server system, a verification request from a first participant of the plurality of participants using a first client system to a second participant of the plurality of participants using a second client system, wherein the second participant is a member of a personal network of the first participant. The method also includes electronically communicating, via the server system, a verification request from the second participant using the second client system to a third participant of the plurality of participants using a third client system, wherein the third participant is a member of a personal network of the second participant. Moreover, the method includes receiving, by the server system, a reply to the verification request from the second participant using the second client server system, a reply to the verification request from the third participant using the third client system, and determining, by the server system, a likelihood that the first participant is a non-terrorist based on the replies received from the second and third participants.

In another aspect, a communication system is provided for identifying non-terrorists among a plurality of participants and non-participants and governed by a non-governmental board of governors from consumer advocate organizations and privacy organizations. The communication system includes a plurality of client systems and at least one server communicatively coupled to the client systems via a network. The server is configured to electronically communicate a verification request from a first participant of the plurality of participants to a second participant of the plurality of participants, wherein the second participant is a member of a personal network of the first participant, and to electronically communicate a verification request from the second participant to a third participant of the plurality of participants, wherein the third participant is a member of a personal network of the second participant. The server is also configured to receive a reply to the verification request from the second participant, receive a reply to the verification request from the third participant, and determine a likelihood that the first participant is a non-terrorist based on the replies received from the second and third participants.

In another aspect, a computer program is provided that is embodied on a computer readable medium for identifying non-terrorists among a plurality of participants and non-participants using a system governed by a non-governmental board of governors from consumer advocate organizations and privacy organizations. The computer program includes at least one code segment that configures a processor to electronically communicate, via a server system, a verification request from a first participant of the plurality of participants using a first client system to a second participant of the plurality of participants using a second client system, wherein the second participant is a member of a personal network of the first participant, and to electronically communicate, via the server system, a verification request from the second participant using the second client system to a third participant of the plurality of participants using a third client system, wherein the third participant is a member of a personal network of the second participant. The at least one code segment also configures a processor to receive a reply to the verification request from the second participant using the second client system, receive a reply to the verification request from the third participant using the third client system, and determine a likelihood that the first participant is a non-terrorist based on the replies received from the second and third participants.

BRIEF DESCRIPTION OF THE DRAWINGS

The embodiments described herein may be better understood by referring to the following description in conjunction with the accompanying drawings.

FIG. 7 is an expanded flowchart illustrating the method shown in FIG. 6 for identifying non-terrorists among a group of participants and non-participants using the communication system shown in FIG. 3.

DETAILED DESCRIPTION OF THE INVENTION

Figure 1:
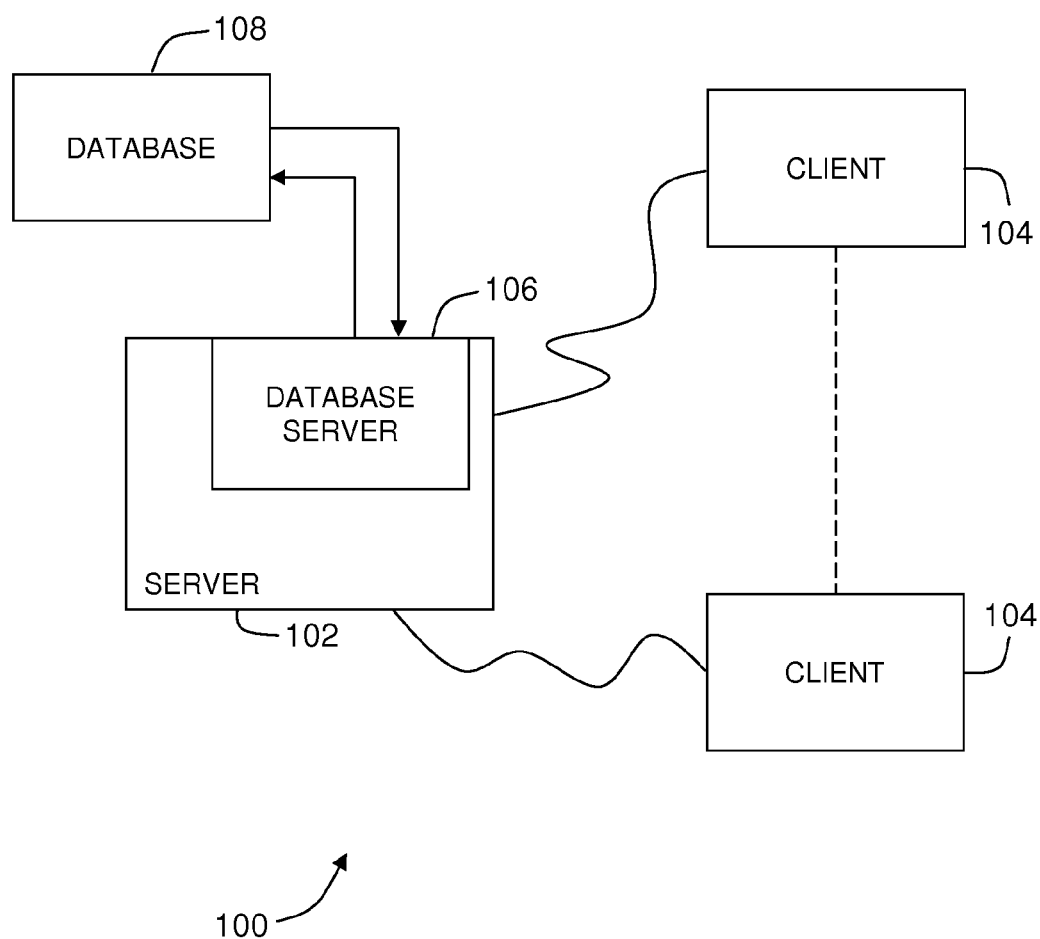
FIG. 1 is a simplified block diagram of an exemplary communication system.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary communication system, embodiments of the invention are operational with numerous other general purpose or special purpose computing system environments or configurations. The communication system is not intended to suggest any limitation as to the scope of use or functionality of any aspect of the invention. Moreover, the communication system should not be interpreted as having any dependency or requirement relating to any one or combination of components illustrated in the exemplary operating environment. Examples of well known systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

Technical effects of the methods, systems, and computers described herein include at least one of (a) prompting a first participant to register in a privacy-sensitive manner with a communication system that is governed by a non-governmental board of governors; (b) receiving a self-identification from the first participant that the first participant is not a terrorist or terrorist threat; (c) sending a verification request from the first participant to participants and/or non-participants in a personal network of the first participant, including a second participant; (d) prompting the second participant to register with the system; (e) receiving from the second participant a reply to the first participant's verification request, wherein the reply is an agreement with the first participant's self-identification, a disagreement with the first participant's self-identification, or neither; (f) receiving a self-identification from the second participant that the second participant is not a terrorist or terrorist threat; (g) sending a verification request from the second participant to participants and/or non-participants in a personal network of the second participant, including a third participant; (h) prompting the third participant to register with the system; (i) receiving from the third participant a reply to the second participant's verification request, wherein the reply is an agreement with the second participant's self-identification, a disagreement with the second participant's self-identification, or neither; (j) storing and processing the replies to the verification requests using a server and a database; and (k) determining a likelihood that the first participant is a non-terrorist based on the processed replies. It should be understood by one of ordinary skill in the art that the systems and methods described herein are not limited to three participants but, rather, that the systems and methods are designed to be used by any number of participants and/or non-participants.

FIG. 1 is a simplified block diagram of an exemplary communication system 100 in accordance with one embodiment. In the exemplary embodiment, system 100 includes a server system 102, and a plurality of client sub-systems, also referred to as client systems 104, connected to server system 102. In one embodiment, client systems 104 are computers including a web browser and/or a client software application, such that server system 102 is accessible to client systems 104 over a network, such as the Internet and/or an intranet. Client systems 104 are interconnected to the Internet through many interfaces including a network, such as a local area network (LAN), a wide area network (WAN), dial-in-connections, cable modems, wireless modems, and/or special high-speed Integrated Services Digital Network (ISDN) lines. As described above, client systems 104 may be any device capable of interconnecting to the Internet including a computer, web-based phone, personal digital assistant (PDA), or other web-based connectable equipment. A database server 106 is connected to a database 108 containing information on a variety of matters, such as data related to facilitating an online product exchange that enables an operator to match purchase requests with offers to sell. In one embodiment, centralized database 108 is stored on server system 102 and is accessed by potential users at one of client systems 104 by logging onto server system 102 through one of client systems 104. In an alternative embodiment, database 108 is stored remotely from server system 102 and may be non-centralized.

As discussed below, database 108 may contain user profiles and/or contact information. A user profile may include, but is not limited to only including, a user identifier such as user name, a password, contact information, mailing information, and/or user preferences for use in searching database 108 and/or displaying searches via client system 104.

The embodiments illustrated and described herein as well as embodiments not specifically described herein but within the scope of aspects of the invention constitute exemplary means for identifying non-terrorists within a large group of participants and non-participants. For example, server system 102 or client system 104, or any other similar computer device, programmed with computer-executable instructions illustrated in FIG. 1 constitutes exemplary means for identifying non-terrorists among a plurality of participants and non-participants using a communication system.

Figure 2:
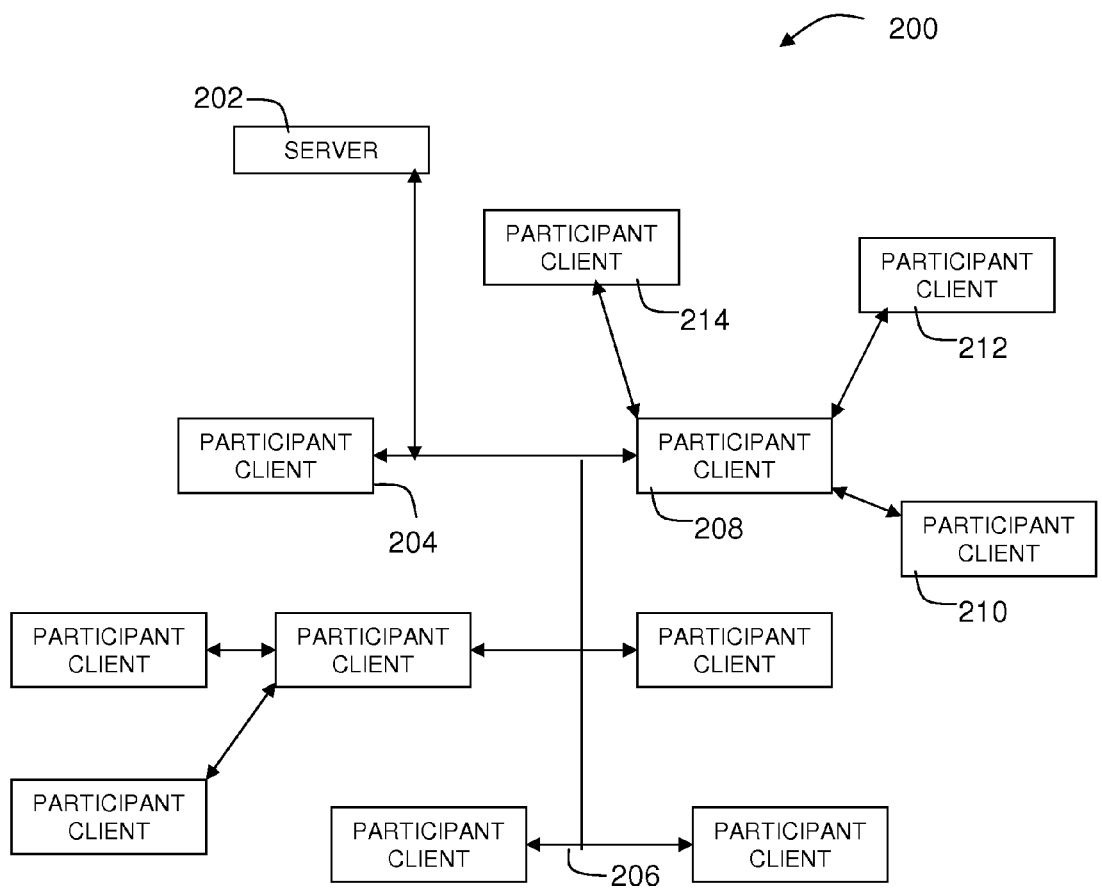
FIG. 2 is a block diagram of an embodiment of a communication system for identifying non-terrorists among a group of participants and non-participants.

FIG. 2 is a block diagram of an embodiment of a communication system 200 for identifying non-terrorists. System 200 includes at least one server 202, and a plurality of participant clients 204. As used herein, the term "participant client" may be used interchangeably with "participant system," "client subsystem," and "client."

Participant clients 204 are connected to each other via a system network 206. Examples of system network 206 include a WAN and a LAN. System network 206 forms a viral network in which multiple participant systems 204 may form a hub and spoke network. For example, participant client 208 is a hub and participant clients 210, 212, and 214 are spokes that communicate with the hub.

Figure 3:
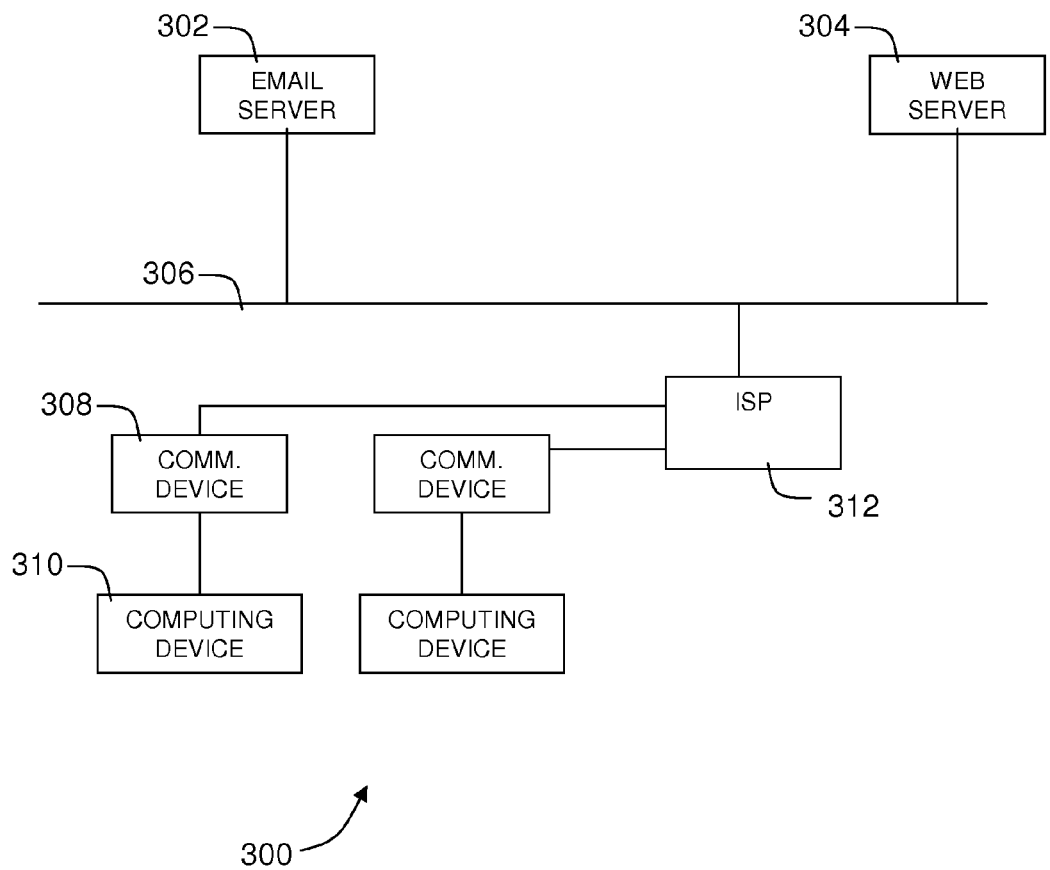
FIG. 3 is a block diagram of another embodiment of a communication system for identifying non-terrorists among a group of participants and non-participants.

FIG. 3 is a block diagram of another embodiment of a communication system 300 for identifying non-terrorists. In the exemplary embodiment, system 300 is monitored and governed by a non-governmental board of governors. The board may include members of consumer advocate organizations and/or members of privacy organizations. System 300 includes at least an email server 302 and a web server 304. System 300 is interconnected by a network 306, such as a LAN, a WAN, or the Internet. System 300 also includes a plurality of communication devices 308, and a plurality of computing devices 310. Each computing devices 310 may be a processor, a personal computer (PC), such as, a i286, i386, i486, Pentium™, or Pentium™ II, a Macintosh™ computer, a Windows-based terminal, a network computer, a wireless device, an information appliance, a reduced instruction set computer (RISC) power PC, a workstation, a mini-computer, a mainframe computer, a cell phone, a personal digital assistant (PDA), or alternatively a computing device that has hardware. As used herein, the term processor is not limited to just those integrated circuits referred to in the art as a processor, but broadly refers to a computer, a microcontroller, a microcomputer, a programmable logic controller (PLC), an application specific integrated circuit (ASIC), and any other programmable circuit. Examples of the hardware include a display screen, an input device, a processor for executing a plurality of application programs, and a storage device for storing the application programs and related information. Examples of the input device include a keypad, a stylus, a keyboard, a mouse, a touch-pad, and a trackball.

An example of each of the communication devices 308 includes a modem and a network interface. A plurality of users, including participants and non-participants of system 300, connect to network 306 via a network connection, such as, a set of standard telephone lines, a set of network links, a broadband connection, or a wireless connection. Examples of each of the network links include T1 and T3 links. Examples of the broadband connection include a frame, a relay, and an asynchronous transfer mode (ATM) connection. Examples of the wireless connection include a connection implementing 802.11(a), 802.11(b), and 802.11(g) protocols. Network 306 includes a plurality of routers and switches. In another embodiment, network 306 includes any number of computing devices 310 and any number of communication devices 308. Network 306 includes an Internet Service Provider (ISP) 312, such as AT&T™ or America Online™ (AOL). Email server 302 and web server 304 are also located within network 306.

Email server 302 includes a port for communicating via a post office protocol (POP), a port for communicating via a simple message transport protocol (SMTP), and a port for communicating via an Internet message access protocol (IMAP), which is a web-based service that allows the users to access an email from a browser interface of computing device 310. An example of email server 302 is Microsoft Exchange™ and Novell GroupWise™. A participant of system 300 may receive an email from, or alternatively, send an email to, another participant or non-participant of system 300 via email server 302.

Figure 4:
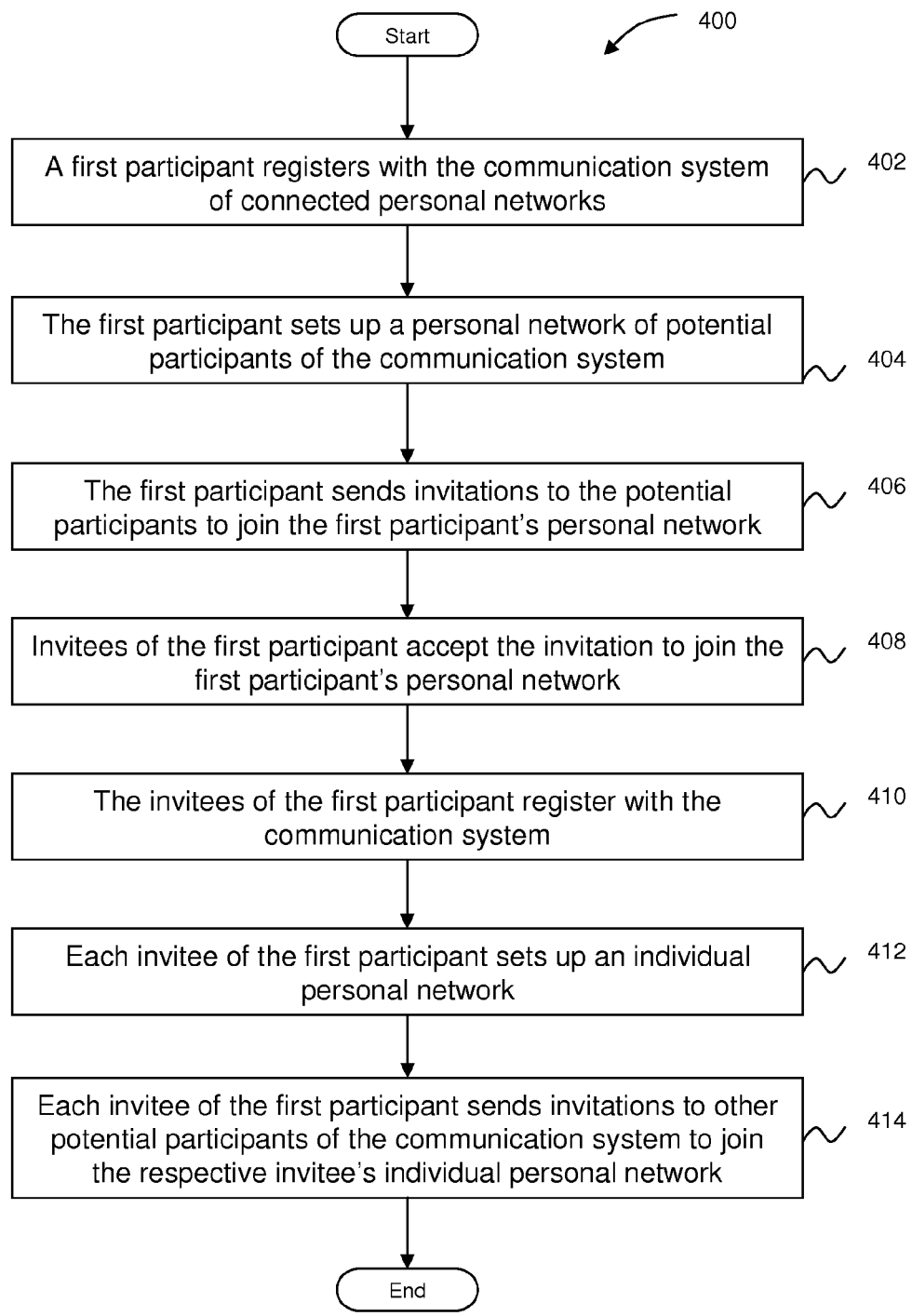
FIG. 4 is a simplified flowchart illustrating a method for setting up the communication system shown in FIG. 3.

FIG. 4 is a simplified flowchart 400 illustrating a method for setting up communication system 300 (shown in FIG. 3) for identifying non-terrorists within a plurality of system participants and non-participants. In the exemplary embodiment, a first participant registers 402 with system 300 in order to send verification requests relating to the first participant's status as non-terrorist to other participants and/or non-participants of system 300. After the first participant has registered, the first participant sets up 404 a personal network of current participants of system 300 and/or potential participants of system 300. The first participant then sends 406 invitations to the current and/or potential participants inviting them to join the first participant's personal network. The invitees of the first participant may either accept or reject the invitation to join the first participant's personal network. Invitees that accept 408 the invitation, and that have not previously registered with system 300, are then prompted to register 410 with system 300. Those invitees that accept the invitation and register with system 300 then setup 412 individual personal networks that include current participants of system 300 and/or potential participants of system 300, unless such an individual personal network has already been setup. Each invitee that accepts the invitation from the first participant then sends 414 invitations to current and/or potential participants inviting them to join the respective invitee's personal network.

Figure 5:
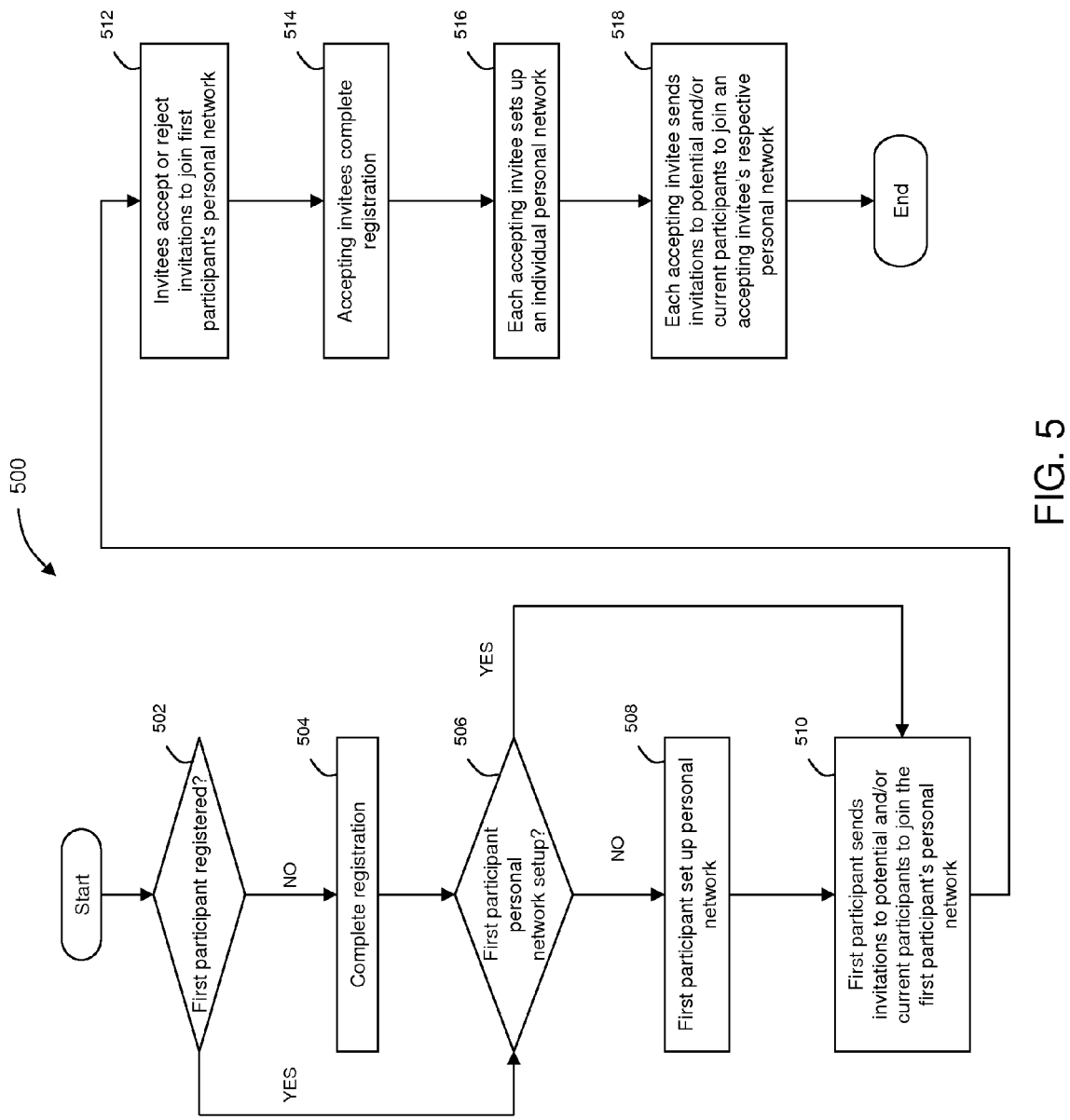
FIG. 5 is an expanded flowchart illustrating the method shown in FIG. 4 for setting up the communication system shown in FIG. 3.

FIG. 5 is an expanded flowchart 500 illustrating the method shown in FIG. 4 for setting up communication system 300 (shown in FIG. 3) for identifying non-terrorists among a group of participants and non-participants. When a first participant accesses system 300 using computing device 310 (shown in FIG. 3), server 202 (shown in FIG. 2) determines 502 whether the first participant is registered with system 300. Upon receiving a determination that the first participant is not registered with system 300, the first participant is prompted to register 504 with system 300 in a privacy-sensitive manner that requests as little personal information as possible. During registration, the first participant provides, for example, a name and contact information, such as an email address and/or a residence address, and provides a user identifier (ID) and password. In some embodiments, participants may not be required to provide a user ID but, rather, the participant's email address may be used as a user ID. Moreover, in some embodiments, participants may not be required to provide either a user ID or a password.

Upon receiving a determination that the first participant is registered with system 300 or, alternatively, upon registering 504 with system 300, server 202 determines 506 whether the first participant has setup a personal network. A personal network includes potential participants and/or current participants to whom the first participant wishes to send verification requests and/or from whom the first participant wishes to receive verification requests. If server 202 determines that the first participant has not setup a personal network, the first participant is prompted to setup 508 a network with system 300. When setting up a network, the first participant enters contact information, such as an email address, IM name, and/or phone number, for other current and/or potential participants of system 300. Server 202 sends 510 to the potential participants, via the entered contact information, invitations to join the first participant's personal network.

Moreover, when setting up a network, the first participant may decide to block verification requests sent by particular participants and/or non-participants of system 300. As such, the first participant may create a list of "allowed" senders and/or a list of "blocked" senders, wherein the first participant is only notified of verification requests from the "allowed" senders. In one embodiment, a participant's inclusion on a "blocked" list does not preclude the participant from receiving the benefits of having identified himself or herself as a non-terrorist, as described below. Further, when setting up a network, the first participant may decide methods of notification of new verification requests. For example, the first participant may wish to receive notification of a new verification request via email only.

After the invitees to the first participant's personal network have received invitations to join the personal network, each invitee accepts or rejects 512 the invitation sent by the first participant. Invitees that reject the invitation may then elect to register 502 with system 300, as described above. In other words, joining the first participant's personal network is not a prerequisite to registering and/or participating in system 300. Potential participants may register of their own volition or may register as a result of an invitation from a current participant. However, in some embodiments, potential participants are not required to register in order to reply to a verification request. Each invitee that accepts the invitation from the first participant is prompted by system 300 to register 514 and to setup 516 an individual personal network, as described above. After setting up an individual personal network, each invitee that accepts the invitation from the first participant then sends 518 invitations to other potential and/or current participants to join the accepting participant's personal network.

Figure 6:
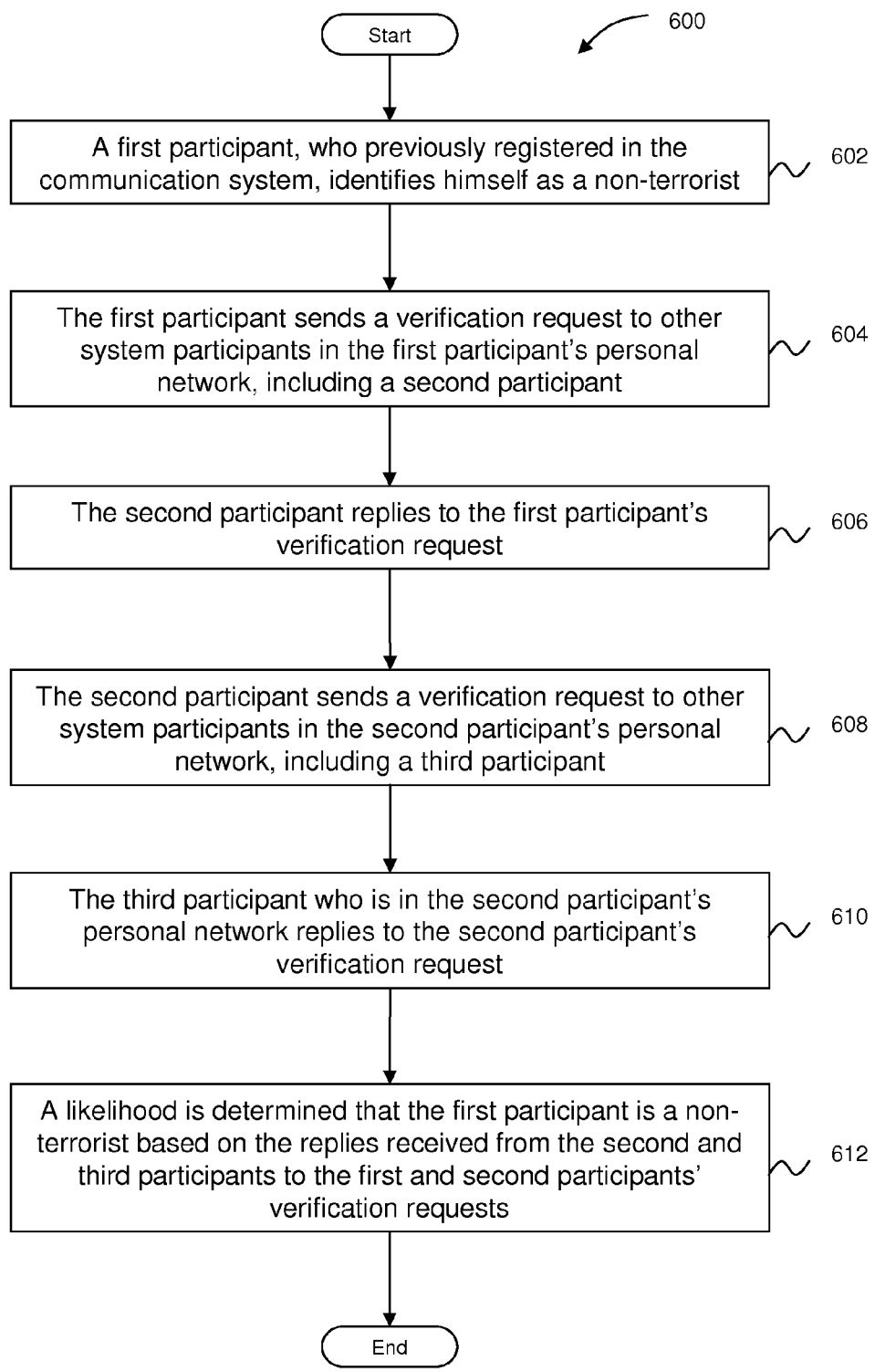
FIG. 6 is a simplified flowchart illustrating a method for identifying non-terrorists among a group of participants and non-participants using the communication system shown in FIG. 3.

FIG. 6 is a simplified flowchart 600 illustrating a method for identifying non-terrorists using communication system 300 (shown in FIG. 3). Any participant that has registered with system 300 may wish to send a verification request related to the participant's status as a non-terrorist to another participant and/or potential participant within his personal network. The verification request may be in the form of, for example, an email, an SMS message, and/or an MMS messages. The first participant identifies 602 himself or herself as a non-terrorist. Using a communication medium, including, but not limited to only including, an email, an IM message, and/or an SMS message, the first participant sends 604, or communicates, a first verification request to other participants and/or potential participants in the first participant's personal network, including a second participant. The second participant, after viewing the comment, may wish to reply 606 to the verification request by agreeing with the first participant's declaration as a non-terrorist or by disagreeing with the first participant's declaration as a non-terrorist. In some embodiments, the second participant's reply is anonymous insofar as the first participant will be unaware whether the second participant has replied or will be unaware of whether the second participant has replied with an agreement, a disagreement, or neither. In addition, the second participant may wish to identify himself or herself as a non-terrorist, and send 608 a second verification request to one or more participants and/or potential participants within the second participant's personal network, including a third participant. After receiving and viewing the verification request, the third participant may wish to reply 610 to the verification request by agreeing with the second participant's declaration as a non-terrorist or by disagreeing with the second participant's declaration as a non-terrorist. When the third participant replies to the second verification request, system 300 determines 612 a likelihood that the first and/or second participants are non-terrorists based on the replies received from the second participant and the third participant.

FIG. 7 is an expanded flowchart 700 illustrating the method shown in FIG. 6 for identifying non-terrorists using communication system 300 (shown in FIG. 3). Any participant registered with system 300 may wish to identify himself or herself as a non-terrorist and to send out one or more verification requests. In so doing, the first participant identifies 702 himself or herself as a non-terrorist. The first participant then sends 704 a first verification request relating to the first participant's self-identification to participants and/or potential participants within the first participant's personal network that includes a second participant of system 300. In the exemplary embodiment, the first verification request identifies includes the first participant's name and self-identification as a non-terrorist. In an alternative embodiment, the first verification request may also include the first participant's address or email address. The first participant may send the first verification request to a portion of the participants and/or potential participants within the first participant's personal network or to all participants and/or potential participants within the first participant's personal network. Server 202 records the first participant's self-identification and the identifier of the second participant in database 108.

When the first participant sends the first verification request to the second participant, the second participant is notified 706 of the request by system 300. The second participant may be notified via phone, email, SMS message, IM message, and/or any other means, according to the second participant's profile. If the second participant is not registered with system 300, the second participant is prompted to register 410 and setup a network 412, as described above in regards to FIG. 4. After being notified of the request, second participant views 708 the request using, for example, computing device 310 (shown in FIG. 3). For example, if the first participant sent the request via email, the second participant uses an email client to view the contents of the comment or may access a webpage via a link embedded within the email request.

Upon viewing the request, the second participant may decide to reply 710 to the first verification request. More specifically, the second participant sends a reply to the request using, for example, computing device 310, wherein the reply is either an agreement or a disagreement. An agreement implies that the second participant recognizes the first participant as a non-terrorist. A disagreement, however, implies that the second participant does not recognize the first participant as a non-terrorist. In some embodiments, the second participant may be offered a third option that he does not have an opinion as to whether the first participant is a non-terrorist. Server 202 records the second participant's reply in database 108. In addition, the second participant may send a second verification request to other participants and/or potential participants of system 300. As such, the second participant identifies 712 himself or herself as a non-terrorist and sends 714 the second verification request to a third participant and/or other participants and potential participants of system 300, wherein the third participant is part of the second participant's personal network. Server 202 records the second participant's self-identification and the identifier of the third participant in database 108. Alternatively, the second participant may send the request to either a portion of the participants and/or potential participants within his personal network or to the all of the participants and/or potential participants within his personal network, including the third participant. The second participant is not required to replay to the first verification request but, rather, may elect to only send the second verification request to his personal network. After the second participant has sent the second verification request to the third participant, system 300 notifies 716 the third participant of the request, as described above. Moreover, once the third participant has been notified of the request, the third participant views 718 the request and replies 720 to the request, as described above. Server 202 records the third participant's reply in database 108.

In the exemplary embodiment, system 300 determines 722 a likelihood that the first participant is a non-terrorist based on the replies from the second and third participants. Specifically, server 202 processes the stored reply from the second participant regarding the first participant's verification request. Server 202 also processes the stored reply from the third participant regarding the second participant's verification request. A reply including a disagreement by either of the second or third participants decreases the likelihood that the first participant is not a terrorist. In some embodiments, participants and/or non-participants may be permitted to change a reply to a previously answered verification request. For example, a participant or non-participant may reconsider a previously submitted answer and may then submit a second response to the same verification request. Accordingly, in such embodiments the second response may replace the earlier response or may be used to adjust the likelihood of the first participant being a non-terrorist as if the second response were from a new participant or non-participant. As another example, the second participant above may login to system 300 using a user ID and password. Once the second participant logs in, he or she may access a list of previously submitted responses. The second participant may then change his or her previously submitted response. Alternatively, the second participant may access a list of received verification requests. The second participant may then answer the same verification request as if the verification request were newly received.

The systems and methods described above facilitate determining a likelihood that any one of a number of participants and/or non-participants of a communication system is a non-terrorist. As a number of participants within a given participant's personal network are identified as non-terrorists, the likelihood of that given participant being a non-terrorist increases. Moreover, as the number of agreements that the given participant is a non-terrorist are stored, the likelihood of that given participant being a non-terrorist increases. Furthermore, although the personal networks of two given participants are unlikely to completely match, as the number of participants increases that are connected to a first participant and that are determined as likely non-terrorists, the likelihood that the first participant is a non-terrorist increases. For example, as described above, an agreement by the second participant that the first participant is a non-terrorist increases the likelihood that the first participant is in fact a non-terrorist. Moreover, an agreement by the third participant that the second participant is a non-terrorist also increases the likelihood that the first participant is a non-terrorist. This is because as a likelihood that the second participant is a non-terrorist increases, that likelihood weighs in favor of the first participant as well, even if the third participant is not in the first participant's personal network. Further, should the third participant decide to self-identify himself or herself as a non-terrorist and/or send out verification requests to additional participants, any agreements received by the system that the third participant is a non-terrorist will also increase the likelihood that the first participant is a non-terrorist due to the same transitive quality. As such, this transitive quality serves to increase the likelihood of a given participant's status as a non-terrorist as the network grows larger, and as more personal networks are linked by common participants.

If, for example, a first participant declares that he or she is a non-terrorist and then sends out a number of verification requests that are left unanswered, the likelihood that the first participant is a non-terrorist subsequently decreases. This is because a high percentage of verification requests receive replies that agree with the first participant's declaration. Similarly, if a sufficiently large number of participants or potential participants disagree with the first participant's declaration, the likelihood that the first participant is a non-terrorist decreases. This is because a high percentage of verification requests are replied to in the negative—the replying participants disagree with the first participant's declaration. Accordingly, in the exemplary embodiment, responses to a particular participant's verification requests are not shared with the particular participant. Moreover, participants and/or non-participants that reply to verification requests may be informed of this policy of nondisclosure in the verification request itself.

To aid future investigations, system 300 may create a flag or other indicator within database 108 that marks a particular participant. For example, if a sufficiently high number of verification requests are replied to with disagreements, database 108 may create a flag on the first participant's account. Similarly, if a sufficiently high number of verification requests are unanswered, database 108 may create a flag. Such a flag may be created based on a predetermined percentage of requests being answered and/or a predetermined percentage of requests being replied to with an agreement. Moreover, in some embodiments, verification requests that are sent to participants and/or potential participants with incorrect destination information may not be counted as unanswered requests. For example, if a given participant inputs an incorrect email address for another participant or potential participant, and the verification request is returned to server 202 as undeliverable, the unanswered verification request is not counted among any other unanswered verification requests in determining whether to create a flag on the participant's profile.

In addition, the systems and methods described herein facilitate preventing tampering by actual terrorists using the same transitive situation. For example, if a first terrorist self-identifies himself or herself as a non-terrorist and sends verification requests to a personal network, no additional participants will be willing to agree on the a given participant's declaration as a non-terrorist. Accordingly, the likelihoods of the terrorist or the members of the terrorist's personal network will be lower than those of non-terrorists.

In some embodiments, participants may use system 300 to order an identification card. For example, a first participant may use computing device 310 to interface with web server 304. An identification card may include such features as a picture of the participant and/or personal information of the participant, including a name, an address, a Social Security number, and/or a birth date. Moreover, the participant may be prompted to enter the desired information and to then pick up an identification card at a controlled facility, such as a police station. As such, the identification card may include a finger print, DNA data, and/or any other suitable identifying data. An identification card may be used to, for example, bypass general admission lines into events. An identification card may also be used at specially designed security checkpoints in transportation settings such as airports and/or train stations. As such, an identification card may be used to facilitate passage of non-terrorists through critical points of access. Non-participants to system 300 would therefore be required to wait in security lines and/or be subjected to investigative techniques, such as bag searches, body frisking, scanning, and any other known technique for searching for contraband and/or identification.

Should a terrorist act occur, system 300 facilitates a fast start to an investigation. Specifically, the board of governors may have authority granted to it by system participants to release some identification data and/or personal network data in the event of a terrorist act in order to facilitate an investigation. Moreover, the board of governors may release data such as participants and/or non-participants to whom verification requests were sent by a particular participant. Furthermore, the board of governors may release data such as replies received by system 300 to verification requests sent by a particular participant. Releasing identification data and/or personal network data for participants may enable authorities to determine persons of interest during an investigation. Moreover, when authorities determine a person of interest is a participant to system 300, the participant's personal network enables authorities to quickly determine a supplementary set of persons of interest. In addition, if any of the supplementary set of persons is participants to system 300 their personal networks may further provide leads. Such authority may be granted by each participant during registration by requiring the participant to, for example, acknowledge such authority by checking a box or by some similar action. Similarly, registration with system 300 may require participants to accept an end user license agreement (EULA) or similar contractual statement that includes such authority being granted to the board. In some embodiments, the authorization to release data may require that the board of governors be presented with a search warrant or subpoena. Moreover, in some embodiments, the authorization to release data may include a stipulation that participants or non-participants be notified if data is released. This notification may be issued on a system-wide basis or may be localized to only those participants or non-participants associated with the released data.

The steps of the embodiments of methods for identifying non-terrorists illustrated in FIG. 4-7, in some instances, may be performed sequentially, in parallel, or in an order other than that which is described. It will be appreciated that not all of the methods illustrated in FIGS. 4-7 and herein described are required to be performed, that additional methods may be added, and that some of the illustrated methods for identifying non-terrorists may be substituted with other techniques.

Moreover, the methods illustrated in FIGS. 4-7 may be embodied on a computer readable medium as a computer program, and/or implemented and/or embodied by any other suitable means. The computer program may include a code segment that, when executed by a processor, configures the processor to perform one or more of the functions of the methods illustrated in FIGS. 4-7.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for identifying non-terrorists among a plurality of participants using a communication system governed by a non-governmental board of governors from consumer advocate organizations and privacy organizations, the communication system including a plurality of client systems and a server system connected to the plurality of client systems through a network, said method comprising:

electronically communicating, via the server system, a verification request from a first participant of the plurality of participants using a first client system to a second participant of the plurality of participants using a second client system, wherein the second participant is a member of a personal network of the first participant;

electronically communicating, via the server system, a verification request from the second participant using the second client system to a third participant of the plurality of participants using a third client system, wherein the third participant is a member of a personal network of the second participant;

receiving, by the server system, a reply to the verification request from the second participant using the second client system;

receiving, by the server system, a reply to the verification request from the third participant using the third client system; and determining, by the server system, a likelihood that the first participant is a non-terrorist based on the replies received from the second and third participants.

2. A method in accordance with claim 1, further comprising registering, by each of the plurality of participants, with the communication system in a privacy-sensitive manner.

3. A method in accordance with claim 2, wherein registering with the communication system precedes receiving a verification from the first participant that the first participant is a non-terrorist.

4. A method in accordance with claim 1, further comprising creating a personal network of each participant in the plurality of participants, wherein each personal network includes other participants of the plurality of participants to whom a particular participant wishes to send a verification request and from whom the particular participant wishes to receive a verification request, the personal network also including potential participants of the system to whom the particular participant wishes to send the verification request.

5. A method in accordance with claim 1, wherein receiving a reply to the verification request from the second participant comprises receiving, by the server system, one of an agreement from the second participant that the first participant is a non-terrorist and a disagreement from the second participant that the first participant is a non-terrorist.

6. A method in accordance with claim 5, wherein receiving a reply to the verification request from the third participant comprises receiving, by the server system, one of an agreement from the third participant that the second participant is a non-terrorist and a disagreement from the third participant that the second participant is a non-terrorist.

7. A method in accordance with claim 6, further comprising storing, in a database, the replies received by the server system from each of the second and third participants.

8. A method in accordance with claim 7, wherein determining a likelihood that the first participant is a non-terrorist comprises:

processing, using the server system, the stored reply from the second participant including the one of the agreement and the disagreement that the first participant is a non-terrorist;

processing, using the server system, the stored reply from the third participant including the one of the agreement and the disagreement that the second participant is a non-terrorist; and determining the likelihood that the first participant is a non-terrorist, wherein a disagreement received from at least one of the second participant and the third participant decreases the likelihood that the first participant is a non-terrorist.

9. A method in accordance with claim 1, further comprising receiving an order, using the server system, for an identification card from a particular participant of the plurality of participants determined as likely to be a non-terrorist.

10. A communication system configured to identify non-terrorists among a plurality of participants and governed by a non-governmental board of governors from consumer advocate organizations and privacy organizations, said communication system comprising:

a plurality of client systems; and at least one server communicatively coupled to said plurality of client systems via a network, said at least one server configured to:

electronically communicate a verification request from a first participant of the plurality of participants to a second participant of the plurality of participants, wherein the second participant is a member of a personal network of the first participant;

electronically communicate a verification request from the second participant to a third participant of the plurality of participants, wherein the third participant is a member of a personal network of the second participant;

receive a reply to the verification request from the second participant;

receive a reply to the verification request from the third participant; and determine a likelihood that the first participant is a non-terrorist based on the replies received from the second and third participants.

11. A communication system in accordance with claim 10, wherein said at least one server is configured to prompt each of the plurality of participants to register in a privacy-sensitive manner.

12. A communication system in accordance with claim 11, wherein said at least one server is configured to prompt each of the plurality of participants to register prior to receiving a verification from the first participant that the first participant is a non-terrorist.

13. A communication system in accordance with claim 10, wherein said at least one server is configured to prompt each of the plurality of participants to create a personal network, wherein each personal network includes other participants of the plurality of participants to whom a particular participant wishes to send a verification request and from whom the particular participant wishes to receive a verification request, the personal network also including potential participants of said communication system to whom the particular participant wishes to send the verification request.

14. A communication system in accordance with claim 10, wherein said at least one server is configured to receive one of an agreement from the second participant that the first participant is a non-terrorist and a disagreement from the second participant that the first participant is a non-terrorist.

15. A communication system in accordance with claim 14, wherein said at least one server is configured to receive one of an agreement from the third participant that the second participant is a non-terrorist and a disagreement from the third participant that the second participant is a non-terrorist.

16. A communication system in accordance with claim 15, wherein said at least one server is further coupled to a database, said at least one server configured to store in said database the replies received by said server from each of the second and third participants.

17. A communication system in accordance with claim 16, wherein said at least one server is configured to:
- process the stored reply from the second participant including the one of the agreement and the disagreement that the first participant is a non-terrorist;
- process the stored reply from the third participant including the one of the agreement and the disagreement that the second participant is a non-terrorist; and
- determine the likelihood that the first participant is a non-terrorist, wherein a disagreement received from at least one of the second participant and the third participant decreases the likelihood that the first participant is a non-terrorist.

18. A communication system in accordance with claim 10, wherein said at least one server is configured to receive an order for an identification card from a particular participant of the plurality of participants determined as likely to be a non-terrorist.

19. A computer program embodied on a non-transitory computer readable medium for identifying non-terrorists among a plurality of participants using a system governed by a non-governmental board of governors from consumer advocate organizations and privacy organizations, said computer program comprising at least one code segment that configures a processor to:
- electronically communicate, via a server system, a verification request from a first participant of the plurality of participants using a first client system to a second participant of the plurality of participants using a second client system, wherein the second participant is a member of a personal network of the first participant;
- electronically communicate, via the server system, a verification request from the second participant using the second client system to a third participant of the plurality of participants using a third client system, wherein the third participant is a member of a personal network of the second participant;
- receive a reply to the verification request from the second participant using the second client system;
- receive a reply to the verification request from the third participant using the third client system; and
- determine a likelihood that the first participant is a non-terrorist based on the replies received from the second and third participants.

20. A computer program in accordance with claim 19, further comprising at least one code segment that configures a processor to prompt each of the plurality of participants to register in a privacy-sensitive manner.

21. A computer program in accordance with claim 20, further comprising at least one code segment that configures a processor to prompt each of the plurality of participants to register with the system prior to the processor receiving a verification from the first participant that the first participant is a non-terrorist.

22. A computer program in accordance with claim 19, further comprising at least one code segment that configures a processor to prompt each of the plurality of participants to create a personal network using a respective client system, wherein each personal network includes other participants of the plurality of participants to whom a particular participant wishes to send a verification request and from whom the particular participant wishes to receive a verification request, the personal network also including potential participants of the system to whom the particular participant wishes to send the verification request.

23. A computer program in accordance with claim 19, further comprising at least one code segment that configures a processor to:
- receive one of an agreement from the second participant that the first participant is a non-terrorist and a disagreement from the second participant that the first participant is a non-terrorist, and store the reply in a database coupled to the processor; and
- receive one of an agreement from the third participant that the second participant is a non-terrorist and a disagreement from the third participant that the second participant is a non-terrorist, and store the reply in the database.

24. A computer program in accordance with claim 23, further comprising at least one code segment that configures a processor to:
- process the stored reply from the second participant including the one of the agreement and the disagreement that the first participant is a non-terrorist;
- process the stored reply from the third participant including the one of the agreement and the disagreement that the second participant is a non-terrorist; and
- determine the likelihood that the first participant is a non-terrorist, wherein a disagreement received from at least one of the second participant and the third participant decreases the likelihood that the first participant is a non-terrorist.

* * * * *